(12) United States Patent
Kitayama et al.

(10) Patent No.: US 6,548,577 B2
(45) Date of Patent: Apr. 15, 2003

(54) WOOD-FILLED THERMOPLASTIC RESIN COMPOSITION AND A PROCESS FOR PRODUCING THE SAME

(75) Inventors: Takeo Kitayama, Ibaraki (JP); Shiro Katagiri, Ibaraki (JP); Shigeyoshi Matsubara, Osaka (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/906,000

(22) Filed: Jul. 17, 2001

(65) Prior Publication Data

US 2002/0016388 A1 Feb. 7, 2002

(30) Foreign Application Priority Data

Jul. 19, 2000 (JP) ........................................ 2000-218856

(51) Int. Cl.⁷ ................................................. C08L 1/00
(52) U.S. Cl. ............................ 524/35; 524/47; 523/124
(58) Field of Search ........................... 428/318.4, 319.3, 428/319.7, 320.2, 321.1, 321.5, 322.7; 524/34, 35, 42; 523/124

(56) References Cited

U.S. PATENT DOCUMENTS 5,451,454 A * 9/1995 Fukahori et al. .......... 428/318.4
5,587,204 A * 12/1996 Kinsey et al. ............... 427/411
6,231,970 B1 * 5/2001 Andersen et al. .......... 106/145.1

OTHER PUBLICATIONS

JP–A–S54011162 (Abstract).
Patent Abstracts of Japan, "Composite Resin Composition", Yoshihiko et al., Publ. No. 57–042751, Publ. Date: May 10, 1982.

Patent Abstracts of Japan, "Filler–Containing Thermoplastic Composition", Isamu et al., Publ. No. 57–014649, Publ. Date: Jan. 25, 1982.

Patent Abstracts of Japan, "Wood–Filled Composite Resin Composition", Kogyo et al., Publ. No. 59–217744, Publ. Date: Dec. 7, 1984.

Patent Abstracts of Japan, "Wood–Filler–Reinforced Resin Material", Yoshio et al., Publ. No. 06–345936, Publ. Date: Dec. 20, 1994.

Patent Abstracts of Japan, "Manufacture of Compound Composition Utilizing Wood Fiber", Kamimoto Hiroshi, Publ. No. 60–161113, Publ. Date: Aug. 22, 1985.

Patent Abstracts of Japan, "Thermoplastic Resin Composition", Hidenori et al., Publ. No. 11–043562, Publ. Date: Feb. 16, 1999.

Patent Abstracts of Japan, "Thermoplastic Resin Composition", Hidenori et al., Publ. No. 11–012401, Publ. Date: Jan. 19, 1999.

Patent Abstracts of Japan, "Composite Resin Composition", Yoshihiko et al., Publ. No. 58–091745, Publ. Date: May 31, 1983.

* cited by examiner

*Primary Examiner*—James J. Seidleck
*Assistant Examiner*—Travis B Ribar
(74) *Attorney, Agent, or Firm*—Fitch, Even, Tabin & Flannery

(57) ABSTRACT

The present invention relates to a wood-filled thermoplastic resin composition comprising wood meal, thermoplastic resin particles and a binder solution, and a process for producing the same.

14 Claims, No Drawings

WOOD-FILLED THERMOPLASTIC RESIN COMPOSITION AND A PROCESS FOR PRODUCING THE SAME

BACKGROUND OF THE INVENTION

1. Field of the Invention

The present invention relates to a wood-filled thermoplastic resin composition and a process for producing the same.

2. Description of the Related Art

Heretofore, a thermoplastic resin composition containing wood meal is well known as a raw material for interior members in automobiles, etc.

However, thermoplastic resins such as polyethylene and polypropylene are generally non-polar while the wood meal has polar groups such as hydroxyl group, so that the affinity between the wood meal and thermoplastic resin particles is low, and by mere mixing thereof, the wood meal and thermoplastic resin particles are not combined, thus failing to form a stable composition. Accordingly, it was necessary for preparation of the above composition that wood meal is introduced into a molten thermoplastic resin liquefied by heating, and the wood meal is impregnated with, and absorbed by, the thermoplastic resin to unify them (Japanese examined patent application JP 59-49188-B).

In such a method, however, the wood meal scatters significantly upon mixing of the wood meal with the thermoplastic resin particles, and further the thermoplastic resin is melted and kneaded with the wood meal at high temperatures to cause a nasty smell significantly by "burning" of the wood meal, thus leading to many problems in the operativeness and working atmosphere.

To improve the affinity between the wood meal and thermoplastic resin particles, a method wherein an ethylene/organic acid (e.g. maleic acid) copolymer or modified polypropylene is added prior to melting and kneading of the thermoplastic resin particles with the wood meal is also proposed (Japanese examined patent applications JP 59-30176-B & JP-B 64-1503-B). Although the affinity is improved in such a method, it is not always possible to solve problems such as scattering of wood meal and a nasty smell upon melting and kneading, and further the concentration of chargeable wood meal is up to about 50% by weight, and if the wood meal is added in an amount exceeding this concentration, there easily occurs the separation of the wood meal from the thermoplastic resin particles as well as the bridge formation thereof in a molding hopper, and the wood meal is dispersed heterogeneously, thus causing problems such as a defect in the outward appearance of moldings.

SUMMARY OF THE INVENTION

Under these circumstances, the present inventors made much study for developing a wood-filled thermoplastic resin composition free of problems such as scattering of wood meal and a nasty smell due to burning, in which wood meal can be dispersed uniformly at a high concentration of charged wood meal, and as a result, the present invention was reached.

That is, the present invention provides a wood-filled thermoplastic resin composition, comprising wood meal, thermoplastic resin particles and a binder solution.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step.

DETAILED DESCRIPTION OF THE INVENTION

Hereinafter, the present invention is described in detail.

In the wood-filled thermoplastic resin composition of the present invention, finely divided materials or sawdust from known wood can be used as the wood meal, but use of waste wood is more economically advantageous.

The material of wood meal is not particularly limited, but conifers such as a Japanese cypress, a Japanese hemlock etc. are preferable to confer mechanical strength on moldings formed from the wood-filled thermoplastic resin composition.

If the particle diameter of the wood meal is too large, the affinity between the wood meal and the thermoplastic resin particles is lowered, and thus the maximum particle diameter of at least 80% of the particle group constituting the wood meal is preferably 2 mm or less.

The thermoplastic resin in the thermoplastic resin particles includes polyolefins such as polypropylene and polyethylene, acrylonitrile-styrene-butadiene block copolymers, polystyrene, polyamide such as nylon, polyester, polyvinyl chloride, polycarbonate, acryl resin, and thermoplastic elastomers such as EPM (ethylenepropylenediene copolymers), and they are used singly or as a mixture thereof, or as a polymer alloy using them. Among them, polyethylene and polypropylene are used preferably and particularly polypropylene excellent in heat resistance is preferably used.

Such thermoplastic resin particles may have an arbitrary shape e.g. sphere, pellet or cube, and is not particularly limited, but the maximum particle diameter of at least 80% of the particle group constituting the thermoplastic resin particles is preferably 2 mm or less.

The binder in the binder solution has a function as a sticking agent for sticking the wood meal on the thermoplastic resin particles, and is not particularly limited insofar as it has such a function, and in particular water-soluble high hydrogen bonding resins such as polyvinyl alcohol, polyvinyl ether, polyvinyl pyrrolidone, sodium polyacrylate and polyacrylamide are desirably used. Among them, polyvinyl alcohol excellent in heat resistance is preferably used.

Such a binder is used as a solution, and as the solvent therefor, any solvents capable of dissolving said binder can be used without particular limitation, and examples thereof include water and various kinds of conventionally used organic solvents such as aliphatic hydrocarbons such as hexane and heptane, aromatic hydrocarbons such as toluene and xylene, alcohols such as methyl alcohol, ethers such as ethyl ether and dioxane, ketones such as acetone, and esters such as ethyl acetate.

Such solvent may be selected suitably depending on the binder to be used, and a single solvent or a mixture of two or more solvents may be used.

If a mixture of two or more solvents is used, the solvents are used preferably as a uniform mixture in which they are miscible with one another, but insofar as the binder is dissolved in some or all the solvents to form a solution, the solvents may also be used as a heterogeneous mixture.

It is preferable for safety and handling that among such solvents, water alone or a mixed solvent of water and a hydrophilic solvent is used and thus the binder solution is used as an aqueous solution or as a solution in a mixed solvent of water and a hydrophilic solvent, and particularly when the binder is a water-soluble high hydrogen bonding resin, the binder solution is used preferably as an aqueous solution.

In the wood-filled thermoplastic resin composition of the present invention, the compounding ratio of the wood meal and thermoplastic resin particles is determined depending on the intended use of the final product, and is not particularly limited, but usually the compounding ratio by weight of wood meal/thermoplastic resin particles is in the range of from 10/90 to 80/20, and since compounding of wood meal in a larger amount is economically advantageous, the compounding ratio is preferably in the range of from 50/50 to 80/20, more preferably from 50/50 to 70/30.

The amount of the binder solution is not particularly limited either, and is suitably determined depending on various conditions such as the kinds and shape of the wood meal, the size of the particles of the wood meal, the compounding ratio of the wood meal/the thermoplastic resin particles, the shape of the thermoplastic resin particles, and the size of the particles of the thermoplastic resin particles. However, a too small amount of the binder solution makes a uniform composition hardly obtainable, while a too large amount makes an excess of the binder solution needless to achieve the desired effect, and therefore, the amount of the binder solution is usually in the range of 10 to 100% by weight based on the total amount of the wood meal and the thermoplastic resin particles.

The concentration of the binder in the binder solution, which is also determined suitably depending on the various conditions as described above, is varied depending on the amount of the binder solution to be used, and is usually 50% by weight or less, preferably in the range of 50 to 20% by weight.

The wood-filled thermoplastic resin composition of the present invention comprises the wood meal, the thermoplastic resin particles and the binder solution as described above, but inorganic fillers and modified polyolefins may be suitably incorporated into the composition in order to improve the mechanical and thermal properties of moldings formed from the composition and to improve the affinity between the wood meal and the thermoplastic resin particles.

The inorganic fillers to be used for these purposes include e.g. talc, mica, calcium carbonate etc., and the modified polyolefins include e.g. copolymers of maleic anhydride, acrylic acid, methacrylic acid or esters thereof with polypropylene, polyethylene, polybutene, polymethylpentene etc.

In place of such modified polyolefins, maleic anhydride, acrylic acid and methacrylic acid may be incorporated singly into the composition depending on the case.

In addition, various kinds of conventionally used stabilizers, pigments and antistatic agents may be compounded as necessary, and depending on the intended use, various kinds of other modifiers for example molding modifiers such as lubricants, processing stabilizers, plasticizers and compatibilizing agents, surface characteristic modifiers such as gloss agents, antistatic agents and surface processing assistants, electromagnetic characteristic modifiers such as magnetic material and electroconductive material, and biological characteristic modifiers such as antimicrobial agents, anti-fungus agents and preservatives may be compounded as necessary.

The wood-filled thermoplastic resin comprising the wood meal, the thermoplastic resin particles and the binder solution as described above is wetted by the binder solution, and thus even if these materials are stirred, the wood meal and the thermoplastic resin particles are mutually combined by the binder solution to prevent scattering of the wood meal, and by mere stirring thereof, these materials can be formed into a wood-filled thermoplastic resin composition having the wood meal and the thermoplastic resin particles dispersed uniformly therein.

In addition, such a composition can be prepared without requiring high temperatures such as in melting and kneading, there does not occur a nasty smell resulting from burning of the wood meal.

Further, such a wood-filled plastic resin composition is dried to remove the solvent from the binder solution, and the resulting wood-filled thermoplastic resin composition can be used directly as a raw material for moldings because in the uniform composition comprising the wood meal and the thermoplastic resin particles as described above, the wood meal and the thermoplastic resin particles are strongly stuck and combined via the binder.

In the above wood-filled thermoplastic resin composition from which the solvent in the binder solution was removed by drying, complete removal of the solvent is not always necessary, and the amount of the residual solvent may be suitably determined depending on conditions etc. in using the composition as a raw material for moldings, but usually the amount of the residual solvent is about 5% by weight or less, preferably about 3% by weight or less.

Such a wood-filled thermoplastic resin composition comprising the wood meal, the thermoplastic resin particles and the binder solution can be produced easily by mixing these respective components, and the production process itself is not particularly limited.

For more reliably preventing scattering of the wood meal during mixing thereof, however, it is preferable to use a method in which the thermoplastic resin particles and the binder solution are previously mixed to permit the binder solution adhere to the surface of the thermoplastic resin particles, and then this mixture (that is, the thermoplastic resin particles to which the binder solution adhered) are mixed with the wood meal, and it is more preferable to use a method in which the above mixture is added to and mixed with the wood meal in order to mix said mixture with the wood meal.

As the mixer used in this mixing operation, super mixers such as a gelation type mixer, a blend type mixer and a power concrete mixer and various kinds of conventionally used mixers such as a ribbon blender may be used. As opposed to the ribbon blender by which the fluid is mixed by movement in the circumferential direction, the super mixer enables very rapid mixing by spiral movement in both the vertical and circumferential directions with blades rotating at a high speed, and thus the super mixer is preferably used in mixing.

For mixing the wood meal with the thermoplastic resin particles to which the binder solution adhered, they are mixed preferably at a low number of revolutions at an early stage to prevent significant scattering of the wood meal.

This mixing is conducted preferably until the thermoplastic resin particles to which the binder solution adhered are sufficiently mixed with the wood meal to form a sawdust-like mixture as a whole and simultaneously the particle diameter of the wood-filled thermoplastic resin composition becomes several times as large as that of the raw wood meal.

The temperature during mixing is not limited, but room temperature is usually used.

The wood-filled thermoplastic resin composition of the present invention is easily produced in the manner described above, and this composition can be molded into a plate, a sheet or a predetermined product shape by molding techniques such extrusion molding, injection molding and blow molding, but if the solvent contained in the composition is problematic during the molding process, the composition may be dried to such a degree that the amount of the residual solvent is not problematic.

The drying method is arbitrary and may be conducted either at normal pressures or under reduced pressure, but when an organic solvent is used as the solvent in the binder solution, an apparatus by which the solvent can be recovered is preferably used in drying from safety and environmental viewpoints.

The drying temperature is varied depending on the raw thermoplastic resin, the kinds of the solvent to be used and other drying conditions, but the temperature shall be set at a temperature not higher than the softening point of the thermoplastic resin and usually at a temperature of 60 to 110° C.

As described above, drying is carried out such a degree that the amount of the residual solvent is reduced usually to 5% by weight or less, preferably to 3% by weight or less.

After removal of the solvent by driving the wood-filled thermoplastic resin composition thus obtained or without removing the solvent, the composition can be formed into various moldings by the molding techniques described above, and by virtue of the feature of being filled with wood meal, the moldings can be utilized in various kinds of fields such as interior parts in automobiles, house building materials, electrical parts, civil engineering parts and packaging materials.

EXAMPLES

Hereinafter, the present invention is described in more detail by reference to the Examples, which however are not intended to limit the present invention.

Example 1

117 g of an aqueous solution of polyvinyl alcohol (concentration of polyvinyl alcohol: 6.3% by weight) was mixed with 80 g of granular polypropylene (block polypropylene AH630V with a particle diameter of 200 to 300 μm, produced by Sumitomo Chemical Co., Ltd.). Granular polypropylene having the aqueous solution of polyvinyl alcohol adhering to the surface of the particles thereof was obtained.

130 g of wood meal (Lignocel HB120 with a particle diameter of 40 to 120 μm, produced by Miki Sangyo Co., Ltd.) was introduced into a super mixer, and then the above granular polypropylene having the aqueous solution of polyvinyl alcohol adhering to the surface of the particles thereof was introduced into the mixer, and the mixture was stirred for 5 minutes under stirring at a revolution number of 300 rpm, to give a slightly wet wood-filled polypropylene resin composition having the wood meal and granular polypropylene dispersed almost uniformly therein.

The resulting water-containing wood-filled polypropylene resin composition was dried at 105° C. for 5 hours, to reduce its water content to 1% by weight or less.

In a series of these processes, scattering of the wood meal was hardly observed, and the wood meal and the polypropylene particles combined strongly with one another, and thus the so-called "disintegrating phenomenon" was not observed. The resulting wood-filled polypropylene resin composition in a dry state was extruded in a usual manner by a 30 mm single screw extruder (compression ratio: 3.7, L/D=2.4, without vent), to form a plate of 1 mm in thickness.

The extrusion stability was good, and the resulting moldings were also excellent in the outward appearance and shape retention.

Comparative Example 1

10 g of modified polyolefins (Yumex CA60 produced by Sanyo Chemical Industries, Ltd.), and 130 g of the same wood meal and 80 g of the same granular polypropylene as in Example 1, were introduced into a super mixer and stirred at a revolution number of 300 rpm for 5 min.

In a series of these processes, significant scattering of the wood meal was observed, and because of the weak bonding force between the wood meal and the polypropylene particles, the disintegrating phenomenon was observed during handling.

The resulting wood-filled polypropylene resin composition was extruded in the same manner as in Example 1 to give a plate of 1 mm in thickness.

The extrusion stability was unstable, and the resulting moldings showed uneven distribution of the wood meal in the outward appearance, and because of uneven strength in shape retention, the moldings were easily cut off with slight external force.

The wood-filled thermoplastic resin composition of the present invention is free of wood scattering and a nasty smell caused by burning during the production process, is capable of dispersing wood meal at a high concentration therein, and is excellent in the affinity between the wood meal and the thermoplastic resin particles, and thus the moldings obtained by molding said composition are excellent in the outward appearance and superior in the shape retention.

What is claimed is:

1. A wood-filled thermoplastic resin composition, comprising wood meal, thermoplastic resin and a binder solution that comprises a water-soluble high hydrogen bonding synthetic resin.

2. A wood-filled thermoplastic resin composition prepared by drying the wood-filled thermoplastic resin composition of claim 1.

3. The wood-filled thermoplastic resin composition according to claim 1 or 2, wherein said water-soluble high hydrogen bonding synthetic resin is selected from the group consisting of polyvinyl alcohol, polyvinyl ether, polyvinyl pyrroidone, sodium polyacrylate and polyacrylamide.

4. The wood-filled thermoplastic resin composition according to claim 3, wherein the water-soluble high hydrogen bonding resin is polyvinyl alcohol.

5. The wood-filled thermoplastic resin composition according to claim 1 or 2, wherein the thermoplastic resin in the thermoplastic resin particles is a polypropylene resin.

6. The wood-filled thermoplastic resin composition according to claim 1, wherein the solvent in the binder solution is water or a mixed solvent of water and a hydrophilic solvent.

7. The wood-filled thermoplastic resin composition according to claim 1, wherein the amount of the binder solution is 10 to 100% by weight based on the total amount of the wood meal and thermoplastic resin particles.

8. The wood-filled thermoplastic resin composition according to claim 1, wherein the concentration of the binder in the binder solution is 50% by weight or less.

9. The wood-filled thermoplastic resin composition according to claim 1, wherein the compounding ratio by weight of the wood meal/the thermoplastic resin particles is from 50/50 to 80/20.

10. The wood-filled thermoplastic resin composition according to claim 2, wherein the amount of the solvent in the composition is 3% by weight or less.

11. A process for producing the wood-filled thermoplastic resin composition of claim 1, which comprises mixing wood meal, thermoplastic particles and a binder solution.

12. The process for producing a wood-filled thermoplastic resin composition according to claim 11, wherein the thermoplastic resin particles and the binder solution are previously mixed, and then this mixture is mixed with the wood meal.

13. The process for producing a wood-filled thermoplastic resin composition according to claim 12, wherein a mixture of the thermoplastic resin particles and the binder solution is added to and mixed with the wood meal.

14. A process for producing the wood-filled thermoplastic resin composition of claim 2, which comprises mixing wood meal, thermoplastic particles and a binder solution to form an intermediate composition and drying the intermediate composition.

* * * * *